United States Patent [19]

Lindenberger et al.

[11] Patent Number: 4,563,199

[45] Date of Patent: * Jan. 7, 1986

[54] PAINT SPRAY BOOTH EMISSIONS CONTROL PROCESS

[75] Inventors: William H. Lindenberger, Naperville; Theodore P. Sieder; Edwin C. Zuerner, both of Bolingbrook, all of Ill.

[73] Assignee: Nalco Chemical Company, Oak Brook, Ill.

[*] Notice: The portion of the term of this patent subsequent to Aug. 2, 2000 has been disclaimed.

[21] Appl. No.: 491,155

[22] Filed: May 4, 1983

Related U.S. Application Data

[63] Continuation-in-part of Ser. No. 305,882, Sep. 28, 1981, Pat. No. 4,396,405.

[51] Int. Cl.$^4$ .............................................. B01D 47/00
[52] U.S. Cl. ............................................ 55/85; 55/89
[58] Field of Search ................................ 55/84, 85, 89

[56] References Cited

U.S. PATENT DOCUMENTS

| | | |
|---|---|---|
| 1,686,491 | 10/1928 | Hughes et al. . |
| 1,872,617 | 8/1932 | Brown . |
| 3,419,494 | 12/1968 | Teeter et al. . |
| 3,943,954 | 3/1976 | Flournoy et al. . |
| 4,102,303 | 7/1978 | Cordier et al. . |
| 4,220,456 | 9/1980 | Block . |
| 4,261,707 | 4/1981 | Bradshaw et al. . |
| 4,265,642 | 5/1981 | Mir et al. . |
| 4,339,248 | 7/1982 | Garner et al. . |
| 4,378,235 | 3/1983 | Cosper et al. ............ 55/85 |
| 4,396,405 | 8/1983 | Lindenberger ........... 55/85 |

FOREIGN PATENT DOCUMENTS

| | | |
|---|---|---|
| 2511181 | 9/1976 | Fed. Rep. of Germany . |
| 41677 | 4/1976 | Japan . |
| 51-52990 | 11/1976 | Japan . |

Primary Examiner—Bernard Nozick
Attorney, Agent, or Firm—John G. Premo; Robert A. Miller

[57] ABSTRACT

A method for continuously removing volatile organic paint carriers from paint spray booths is disclosed. By the process described, an oil-in-water emulsion is used to contact oversprayed paint in the paint spray booth. The emulsion is then broken and the oil phase is distilled to recover volatile components. The non-volatile components of the oil phase and recovered water are then recombined to form an emulsion and recycled to the paint spray booth.

5 Claims, 1 Drawing Figure

PAINT SPRAY BOOTH EMISSIONS CONTROL PROCESS

This application is a continuation-in-part of applicants' copending application Ser. No. 305,882, filed Sept. 28, 1981, now U.S. Pat. No. 4,396,405.

INTRODUCTION

This invention is directed to a process for recovering volatile organic solvents present in paints from the atmosphere of paint spray booths.

In paint spray booths, substantial quantities of air are used to clean the booth of paint particles, volatile organic paint carriers, and the like. This airstream picks up substantial quantities of volatile organic paint carrier vapors which are then generally discharged into the atmosphere. Discharge into the atmosphere of the airstream containing the volatile organic solvent vapors presents an environment problem, as well as a serious economic problem, in that valuable hydrocarbon solvents are lost. While the airstream in paint spray booths has been conventionally washed with water, the water acts as a poor solvent for the volatile organic materials and performs inadequately in containing these materials. While particulate matter in the form of over sprayed paint solids are trapped by the water, the paint solids tend to hold their associated solvent or carrier, and again, during filtration or the like to recover the paint solids, organic solvent vapors are dissipated into the atmosphere.

Typical paint spray booths operate by passing large volumes of air downward through the spray booth and over the object being painted. The airstream is then, after it has picked up solvent, paint particles, etc., washed with water, the water generally being in a below floor level sump in the spray booth. The water in the sump collects over sprayed paint and solvent materials and the resultant washed air is discharged into the atmosphere.

The modification of existing paint spray booth systems to eliminate discharge of volatilized solvents into the atmosphere would be expensive, and possibly prohibitive, by state of the art techniques such as carbon absorption, incineration, and the like. Accordingly, for economic reasons, modifications must be developed which will avoid the expulsion of volatile organic molecules into the atmosphere. It has been discovered that by the use of certain oil-in-water emulsions that can be used in place of the water in paint spray booths, substantial quantities of solvent from paint spray booths can be recovered.

The process of this invention can generally be described by the following steps of:

A. forming an oil-in-water emulsion of water and a high-boiling organic liquid in which the volatile organic paint carrier is soluble;
B. contacting the emulsion with oversprayed paint in the paint spray booth;
C. continuously withdrawing at least a portion of said emulsion from the paint spray booth;
D. breaking the portion of emulsion withdrawn from the paint spray booth and recovering a carrier-rich, high-boiling organic liquid phase and a water phase;
E. distilling carrier-rich, high-boiling organic liquid phase to recover volatile organic paint carrier therefrom and to recover high-boiling organic liquid;
F. combining the water phase of step D with the recovered high-boiling organic liquid of step E to reform an oil-in-water emulsion; and then,
G. repeating steps B–F above.

Optionally, paint solids in the emulsion may be removed from the emulsion after step C and prior to step D above.

It is, therefore, an object of this invention to provide a process which is readily adaptable to existing paint spray booths which will enable recovery of volatile organic materials used as paint carriers.

Further objects will appear here and after.

BRIEF DESCRIPTION OF THE DRAWINGS

The drawing shows a schematic view of a process for the recovery of volatile organic paint carriers from paint spray booth systems.

DETAILED DESCRIPTION OF THE DRAWINGS

Figure 1:
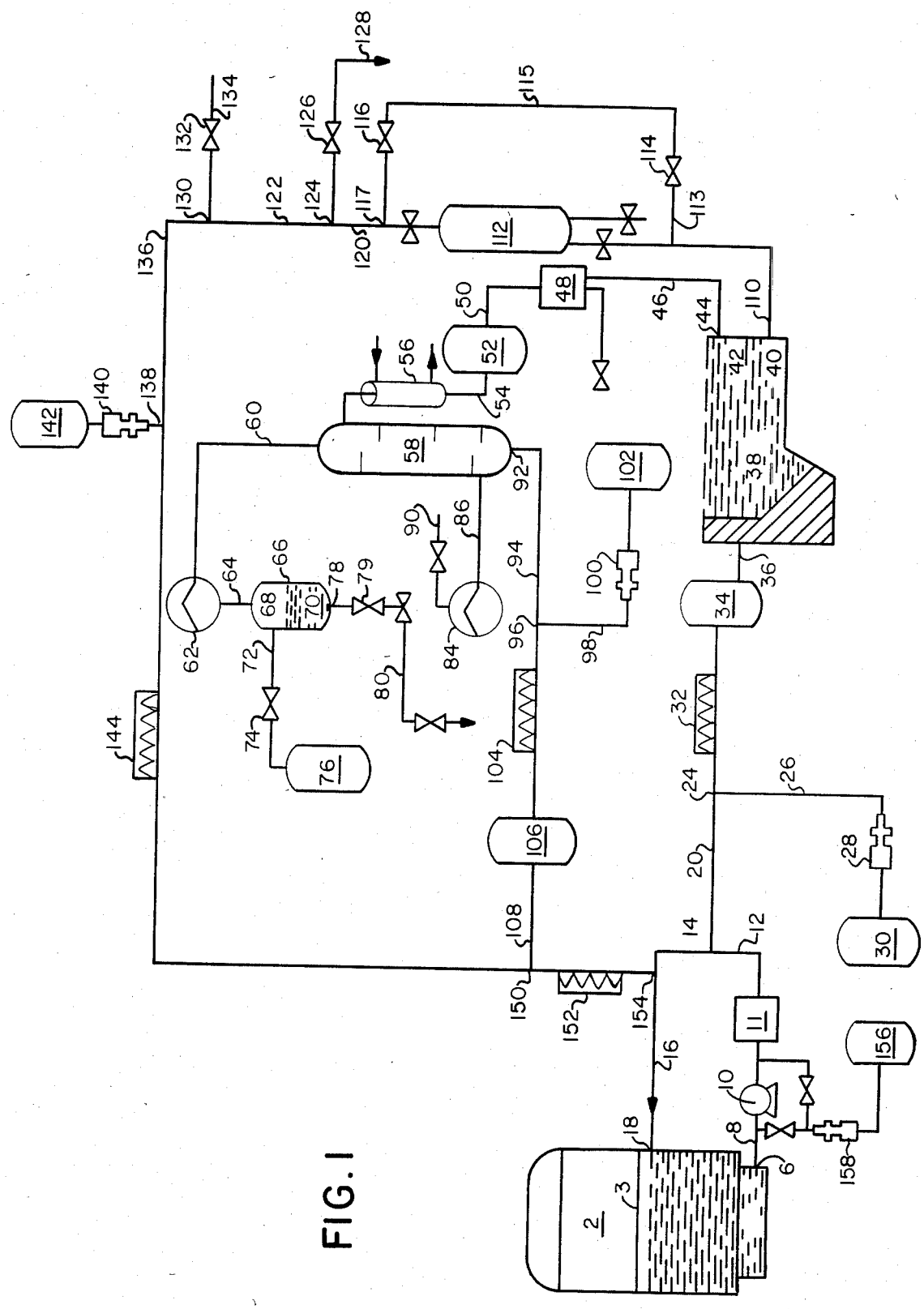

With reference to the Figure, paint spray booth 2 may be of any type equipped to contact oversprayed paint solids and volatile organic paint carriers such as, but not limited to, toluene, methyl ethyl ketone, methyl amyl ketone, heptane, butyl acetate, naptha, ethylene glycol monoethyl ether acetate, etc., using a hydrophilic scrubbing liquid. While in the description of the invention, the term paint is employed, also included within this general description are enamels, lacquers, clear coats, base coats, and other coatings having an organic base. Paint spray booth 2 is equipped with a recirculating system for hydrophilic liquid including liquid outlet 6 connected to line 8, pump 10, sludge separator 11, line 12, line 16, and inlet 18 where the hydrophilic fluid returns to paint spray booth 2. Sludge separator 11 is designed so as to remove oversprayed paint particles from the hydrophilic fluid, and may be a filter, gravity separator, centrifuge, etc.

In a preferred aspect of this invention, the hydrophilic liquid is an oil-in-water emulsion designated by the numeral 4 and is contained within the sump of the paint spray booth. The oil-in-water emulsions employed are similar to those disclosed in U.S. Pat. Nos. 4,261,707 and 4,265,642, as well as Japanese Kokai No. 52990-76. Emulsions useful in this invention can be prepared using almost any oil-in-water emulsifier that will form an oil-in-water emulsion with water and a high boiling organic liquid that can later be broken or separated into a separate oil phase, and a separate water phase. Preferred emulsions are those prepared using certain organic hydrocarbon oils, and water using fatty acids as emulsifiers.

The emulsions may be broken using chemical means such as treatment with inorganic coagulants exemplified by alum or ferric chloride, treatment with organic polymers such as epichlorohydrin-dimethylamine condensation polymers, ethylene dichloride ammonia condensation polymers, polydiallyldimethyl ammonium chloride, copolymers of diallyldimethyl ammonium chloride with acrylamide, and the like. The emulsions may also be broken by pH adjustment with acid or alkali or maybe separated by physical means, including such methods as the use of electrical energy as exemplified in U.S. Pat. No. 4,012,319, filtration, heat, or the addition of other chemical means such as hydrophobic silicas as exemplified in U.S. Pat. No. 4,151,078. It should be pointed out that the method of breaking the emulsion is not critical to this invention so long as the emulsion may be separated into separate aqueous and organic phases, and the constituents, after the volatile organic paint carrier is removed can be recombined to reform the emulsion.

In the recovery of volatile organic paint carriers from the emulsion 4, a portion of the emulsion, but less than one-half of the total volume passing through line 12, is diverted into "tee" 14 and into line 20. Emulsion entering line 20 is normally composed of a volatile organic paint carrier, water, hydrocarbon oil, emulsifier, and paint particles not removed by sludge separator 11. Passing through line 20, scrubbing fluid is contacted at point 24 with optional, but preferred chemical means for breaking emulsion which enters "tee" 24 from tank 30 connected to pump 28 in line 26. Pump 28 is typically of a metering type so that controlled amounts of chemical may be added. Tank 30 as well as the other tanks shown in the drawing are generally equipped with vent and drain means not shown.

After contacting chemical means for breaking emulsion at point 24, scrubbing liquid and chemical emulsion breaker are mixed in mixer 32 and then flow into agitated tank 34 where emulsion starts to break. The unstable emulsion flows through line 36 into oil/water separating unit 38 forming an upper volatile organic paint carrier rich hydrocarbon liquid layer 42 and a lower volatile organic paint carrier lean aqueous phase 40. Separator 38 can be of any number of commercially manufactured units and may or may not have plates as shown in the drawing. Separator 38 can also simply be a large tank with suitable inlets and outlets to withdraw respective phases. In addition, paint solids contained in the emulsion may be recovered from separator 38 by skimming or filtration means not shown. As previously described, the emulsion may be broken by any number of means. Accordingly, the separator employed will depend upon the particular method chosen.

In operation of this system, volatile organic paint carrier rich hydrocarbon oil exits separator 38 at point 44 and flows through line 46 into filter 48. Filter 48 is designed to remove any remaining quantities of paint solids which would interfere with a later distillation step. Exiting filter 48 volatile organic paint carrier rich hydrocarbon oil flows into line 50 and into holding tank 52. From tank 52, volatile organic paint carrier rich hydrocarbon oil enters line 54 which may contain optional heating means 56 to warm the organic paint carrier rich hydrocarbon oil, prior to its entry into a distillation column, preferably steam stripper 58. In the distillation column, volatile organic paint carrier and any water is removed overhead, passing through the top of stripper and into lines 60. Heat exchanger 62 in line 60 condenses volatile organic paint carrier and any remaining water which flows into tank 66 through line 64, forming an upper volatile organic paint carrier phase 68, and a lower aqueous phase 70. Volatile organic paint carrier 68 is recovered via line 72 passing through valve 74 and into tank 76 where volatile organic paint carrier is recovered.

Lower aqueous phase 70 passes out of tank 66 through point 78 and, as desired may be recirculated to heat exchanger 84 and back to steam stripper 58 via line 86. Alternatively, recovered aqueous phase may be routed by line 78 through valve 79 and into line 80 to a waste treatment system or sewer not shown. Fresh water inlet 90 is shown for use in the case of steam stripping. It will also be apparent that plant steam may be substituted with the corresponding elimination of heat exchanger 84.

Hydrocarbon oil, now separated from volatile organic paint carrier and being solvent lean, is of a high boiling nature and does not distill. Accordingly, this fluid drains from bottom of column 58 through point 92 and into line 94 where it contacts point 96 at which point oil-soluble chemical means of reforming emulsion may be added through line 98, pump 100, and tank 102. Pump 100 again is typically of a metering type so as to carefully control chemical addition to point 96.

Hydrocarbon oil is mixed with chemical in mixer 104 and is stored in tank 106. From tank 106 hydrocarbon oil containing chemical means for reemulsification travels along line 108 to point 150.

Referring back to separator 38, lower volatile organic paint carrier lean aqueous phase 40 exits separator through line 110 and enters optional coalescing or sand filter 112 where additional hydrocarbon liquid is removed. Means are optionally provided through line 113, valve 114 line 115 valve 116 and finally line 117 for bypassing coalescing filter. Exiting the coalescing filter 112 or the bypass line at point 120 water travels along line 122 where at point 124 a drain or blow down point is provided to discharge water to sewer or waste treatment system not shown through valve 126 and line 128. Fresh water makeup is provided at point 130 on line 122 where fresh water from source not shown can be added through valve 132 and line 134. Line 122 passes into line 136 where at point 138, an addition point is provided for optional water-soluble chemical means for forming emulsion through pump 140 in tank 142. Pump 140 is preferably a metering pump to carefully control addition of water-soluble chemical emulsifying means. Line 136 then passes into mixer 144 where water is thoroughly mixed with optional water-soluble chemical emulsifying means. Mixed water and emulsifying means then pass through point 150 where it is combined with hydrocarbon oil-containing optional chemical emulsifying means. Emulsion 4 is reformed at mixer 152 from which it reaches point 154 and reenters paint spray booth circulating system through line 16.

As will be seen by those skilled in the art, variations and permutations of the above-described process can be employed without departing from the spirit and intent of this invention. The drawing and description given above have been directed to the case where chemical means are used to form and break the emulsion. As previously described, the emulsion can be broken using means not shown in the drawing. Additionally, it will be noted that other deviations can take place. As an example, an antifoam can be added, if necessary, to the paint spray booth recirculating system at line 8 through tank 156 metering pump 158 either before or after pump 10. Additionally, other antifoam addition points may be placed in the system where necessary.

Other variations that may be made include the use of the optional coalescing filter 112 previously described. Additionally, recovered oil in tank 106 can be mixed with emulsion withdrawn from paint spray booth 2 and then returned to the spray booth with fresh water being added directly to the booth. Tanks holding recovered solvent may also be vented into the spray booth to reduce emissions.

As seen from the drawing, certain points have been included where both oil and water-soluble chemical emulsifying agents may be added. In the preferred embodiment of this invention, the oil-in-water emulsions are pH sensitive, forming at alkaline pH values of from 7.5–12 and breaking at a pH value of from 6.5–2. Accordingly, both tanks 30 and 142 will hold pH adjustment aids. Tank 30 will generally hold an aqueous acid, and tank 142 will hold an aqueous alkalinity adjustment agent. As an example, emulsions may be formed at alkaline pH values of from about 7.5 to 12 and may be broken at acidic pH values of from about 3.5 to approximately 6.5 using the preferred oil-soluble fatty acid emulsifier system. If other chemical emulsifier systems are used, these additives may not be necessary, although other chemical additives may be appropriately used.

It will be seen that none of these changes and others which can be contemplated by those skilled in the art depart from the basic teaching of the invention. A continuous method of recovering volatile paint carriers from paint spray booths using a recyclable oil-in-water emulsion.

We claim:

1. A method for the continuous removal of volatile organic paint carriers from the solvent-laden air in paint spray booths which comprises the steps of:
   A. forming an oil-in-water emulsion of water and a high-boiling oil with an oil-in-water emulsifier, said volatile organic paint carrier being soluble in the high-boiling oil;
   B. contacting the emulsion with particulates and oversprayed paint in the paint spray booth;
   C. continuously withdrawing at least a portion of the emulsion from the paint spray booth;
   D. breaking the portion of emulsion withdrawn from the paint spray booth and recovering a carrier-rich, high-boiling oil phase and a water phase;
   E. removing particulates from the high-boiling oil phase;
   F. distilling carrier-rich, high-boiling oil phase to recover volatile organic paint carrier therefrom and to recover high-boiling oil;
   G. combining the water phase of step D with the recovered high-boiling oil of step F to reform an oil-in-water emulsion; and then,
   H. repeating steps B–G above.

2. The method of claim 1 wherein subsequent to contacting the oil-in-water emulsion with the carrier-laden air in the paint spray booth and prior to breaking said emulsion, the emulsion is filtered to remove paint solids therefrom.

3. A method for recovering volatile organic paint carriers from paint spray booths of the type wherein paint is applied to an object and oversprayed paint is contacted with a hydrophilic liquid which comprises the steps of:
   A. forming an oil-in-water emulsion of water and a high-boiling oil with an oil-in-water emulsifier, said volatile organic paint carrier being soluble in the high-boiling oil;
   B. contacting the emulsion with particulates and oversprayed paint in the paint spray booth;
   C. continuously withdrawing at least a portion of the emulsion from the paint spray booth;
   D. breaking the portion of emulsion withdrawn from the paint spray booth and recovering a carrier-rich, high-boiling oil phase and a water phase;
   E. removing particulates from the high-boiling oil phase;
   F. distilling carrier-rich, high-boiling oil phase to recover volatile organic paint carrier therefrom and to recover high-boiling oil;
   G. combining the water phase of step D with the recovered high-boiling oil of step F to reform an oil-in-water emulsion; and then
   H. repeating steps B–G above.

4. A method for the continuous removal of volatile organic paint carriers from the solvent-laden air in paint spray booths which comprises the steps of:
   A. forming an oil-in-water emulsion of water and a high-boiling oil with an oil-in-water emulsifier, said volatile organic paint carrier being soluble in the high-boiling oil;
   B. contacting the emulsion with particulates and oversprayed paint in the paint spray booth;
   C. continuously withdrawing at least a portion of the emulsion from the paint spray booth;
   D. recovering paint particulates from the emulsion;
   E. breaking the portion of emulsion withdrawn from the paint spray booth and recovering a carrier-rich, high-boiling oil phase and a water phase;
   F. distilling carrier-rich, high-boiling oil phase to recover volatile organic paint carrier therefrom and to recover high-boiling oil;
   G. combining the water phase of step E with the recovered high-boiling oil of step F to reform an oil-in-water emulsion; and then
   H. repeating steps B–G above.

5. A method for recovering volatile organic paint carriers from paint spray booths of the type wherein paint is applied to an object and oversprayed paint is contacted with a hydrophilic liquid which comprises the steps of:
   A. forming an oil-in-water emulsion of water and a high-boiling oil with an oil-in-water emulsifier, said volatile organic paint carrier being soluble in the high-boiling oil;
   B. contacting the emulsion with particulates and oversprayed paint in the paint spray booth;
   C. continuously withdrawing at least a portion of the emulsion from the paint spray booth;
   D. recovering paint particulates from the emulsion;
   E. breaking the portion of emulsion withdrawn from the paint spray booth and recovering a carrier-rich, high-boiling oil phase and a water phase;
   F. distilling carrier-rich, high-boiling oil phase to recover volatile organic paint carrier therefrom and to recover high-boiling oil;
   G. combining the water phase of step E with the recovered high-boiling oil of step F to reform an oil-in-water emulsion; and then,
   H. repeating steps B–G above.

* * * * *